(12) United States Patent
Youm et al.

(10) Patent No.: US 6,956,751 B2
(45) Date of Patent: Oct. 18, 2005

(54) MOTOR POWER SUPPLY

(75) Inventors: Jang-hyoun Youm, Suwon (KR); Won-ki Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 197 days.

(21) Appl. No.: 10/673,135

(22) Filed: Sep. 30, 2003

(65) Prior Publication Data

US 2004/0160792 A1 Aug. 19, 2004

(30) Foreign Application Priority Data

Feb. 14, 2003 (KR) ............... 10-2003-0009432

(51) Int. Cl.[7] ............... H02M 5/45; H02P 3/22
(52) U.S. Cl. ............... 363/37; 318/375; 318/801
(58) Field of Search ............... 363/34, 37, 97, 363/98, 131, 132; 318/375–381, 759–762; 318/800–812; 361/91.1, 91.2, 91.3

(56) References Cited

U.S. PATENT DOCUMENTS

| | | | | |
|---|---|---|---|---|
| 5,038,244 | A | * | 8/1991 | Tuusa ............... 361/56 |
| 5,537,015 | A | * | 7/1996 | Karwath ............... 318/439 |
| 6,700,765 | B2 | * | 3/2004 | Ely ............... 361/91.1 |
| 6,788,014 | B2 | * | 9/2004 | Kissich et al. ............... 318/434 |
| 6,900,606 | B2 | * | 5/2005 | Youm ............... 318/375 |

FOREIGN PATENT DOCUMENTS

| | | |
|---|---|---|
| EP | EP1162726 A1 | 12/2001 |
| JP | 8-317678 | 11/1996 |
| JP | 11-206184 | 7/1999 |
| JP | 2000-270577 | 9/2000 |
| KP | 2001-102962 | 11/2001 |
| KP | 2002-1768 | 1/2002 |
| KP | 10-331831 | 3/2002 |

* cited by examiner

Primary Examiner—Matthew V. Nguyen
(74) Attorney, Agent, or Firm—Staas & Halsey LLP

(57) ABSTRACT

A motor power supply having an inrush current protection mode, a motor drive mode, an overvoltage protection mode, and a dynamic braking mode. In the inrush protection mode, a first resistance limits an inrush current to a capacitor which smoothes a rectifier output to provide DC power to an inverter during the motor drive mode. In the overvoltage protection mode, the first resistance is used in conjunction with a switching element to controllably discharge an overvoltage which may occur across the capacitor due to regenerated energy from the motor passing back through the inverter. During the drive mode, the inverter input is connected with the DC power and during the dynamic braking mode, the inverter input is connected with a second resistance which dissipates the energy regenerated by the motor. A controller controls a multi-contact relay and the switching element to implement the various modes of operation.

27 Claims, 6 Drawing Sheets

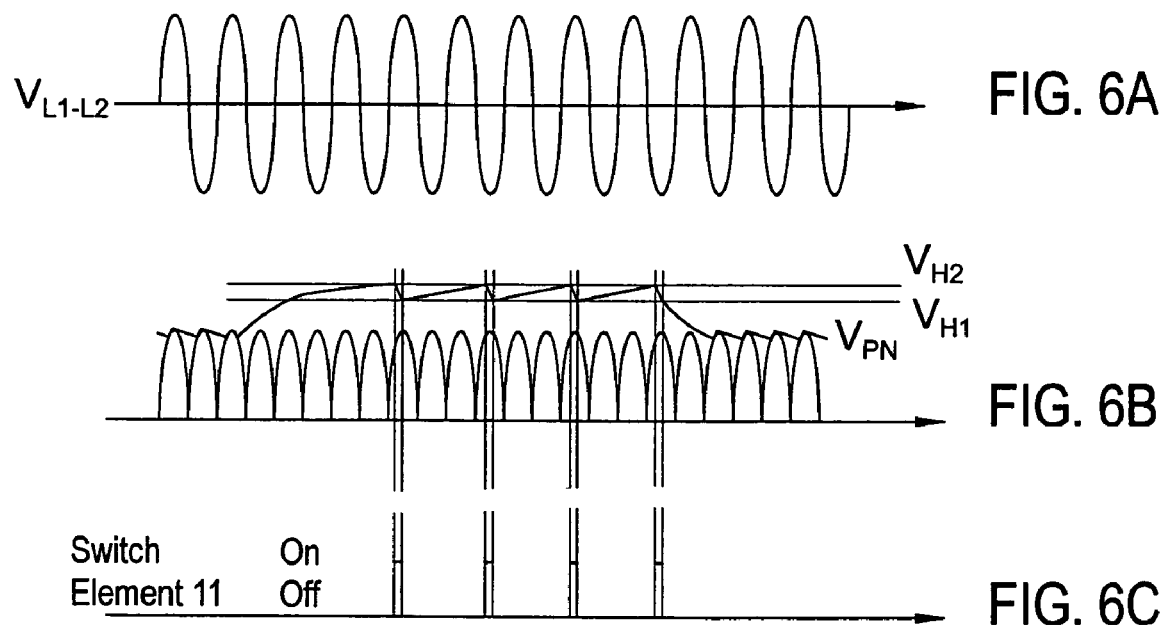

MOTOR POWER SUPPLY

CROSS-REFERENCE TO RELATED APPLICATIONS

This application claims the benefit of Korean Patent Application No. 2003-9432, filed Feb. 14, 2003, in the Korean Intellectual Property Office, the disclosure of which is incorporated herein by reference.

BACKGROUND OF THE INVENTION

1. Field of the Invention

The present invention relates to a power supply for a motor, and more particularly, to a motor power supply including a soft charging circuit, an over voltage protection circuit and a dynamic braking circuit.

2. Description of the Related Art

A three-phase motor has three windings and is driven by three-phase power. To supply the three-phase power, as shown in FIG. 1, a motor power supply for the three-phase motor comprises an AC (alternating current) power supply 101 which supplies commercial AC power (110V/220V), a rectifier 103 which rectifies the commercial AC power from the AC power supply 101 into DC power, a capacitor 115 which smoothes the rectified power from the rectifier 103, and an inverter 116 which converts the DC power from the capacitor 115 into AC power having three phases and a variable frequency.

The inverter 116 includes a PWM (pulse width modulation) part (not shown) to generate a square wave signal for PWM, and a plurality of transistors which are turned on/off in response to the square wave signal of the PWM part. Further, the motor power supply comprises a microprocessor (not shown) which turns on/off the transistors of the inverter 116 in response to the square wave signal of the PWM part and modulates the power frequency to control a rotation speed of the motor 117.

Generally, the motor power supply further comprises a soft charging circuit to protect the capacitor 115 from an excessive inrush current being supplied when power is first supplied, an over voltage protection circuit to protect the capacitor 115 from over voltage, and a dynamic braking circuit to decrease the rotation speed of the three-phase motor 117 more rapidly when the motor is to be stopped or reversed in rotation.

The soft charging circuit is employed for protecting the capacitor 115 from being charged with a heavy inrush current when the power is first supplied, and comprises an inrush current limiting resistor 102 provided between the rectifier 103 and the capacitor 115, and a relay 111 which is turned off to allow the rectified power to be supplied from the rectifier 103 to the capacitor 115 by passing through the inrush current protection resistor 102 or turned on to allow the rectified power to be supplied from the rectifier 103 to the capacitor 115 without passing through the inrush current limiting resistor 102. With this configuration, when the power is first supplied, the relay 111 is turned off, and the inrush current limiting resistor 102 limits the inrush current, thereby protecting the capacitor 115 from damage due to the inrush current when the power is first supplied.

The over voltage protection circuit comprises an over voltage protection resistor 112 and an over voltage protection switching element 114 which are connected with each other in series. The series combination of the switching element 114 and the overvoltage protection resistor 112 is connected in parallel with the capacitor 115, and an over voltage protection diode 113 connected in parallel with the over voltage protection resistor 112. While the motor 117 is driven, in the over voltage protection circuit, the over voltage protection switching element 114 is turned on when a voltage regenerated from the motor 117 through the inverter 116 and applied to opposite ends (P and N) of the capacitor 115 reaches a predetermined over voltage, so that the over voltage protection resistor 112 dissipates the over voltage power into heat energy, thereby protecting the capacitor 115 from damage due to the over voltage.

The dynamic braking circuit comprises a dynamic braking resistor network 120 and a relay 122 which connects resistors $R_{D1}$, $R_{D2}$ and $R_{D3}$ to power input terminals U, V and W, respectively, of the motor 117. The dynamic braking circuit brings the motor 117 to a stop when the motor 117 is not being driven, and prevents the motor 117 from being forcibly rotated by an external force after the motor 117 is stopped. Here, the relay 122 is turned off while the motor 117 is driven, and turned on when the motor 117 is braked or after the motor 117 is stopped, thereby bring the motor 117 to a sudden stop or preventing the motor 117 from being forcibly rotated by the external force.

However, in the conventional motor power supply, the soft charging circuit is operated only when the power is first supplied. In other words, the soft charging circuit is not needed in the state that the power is being supplied and the capacitor 115 is charged. Further, the over voltage protection circuit is needed only when the motor 117 is controlled in the state that the capacitor 115 is sufficiently charged with the power and has a stable voltage. Further, the dynamic braking circuit is operated only when the motor 117 is braked or after the motor 117 is stopped. Like the soft charging circuit, the dynamic braking circuit is not needed while the motor 117 is normally driven in the state that the power is being supplied and the capacitor 115 is charged.

Thus, in the conventional motor power supply, the foregoing circuits are independently provided, so that elements are duplicated, thereby increasing the size of the motor power supply and a production cost thereof.

SUMMARY OF THE INVENTION

Accordingly, it is an aspect of the present invention to provide a motor power supply in which some elements are shared, thereby decreasing the size and the production cost thereof.

Additional aspects and advantages of the invention will be set forth in part in the description which follows and, in part, will be obvious form the description, or may be learned by practice of the invention.

The foregoing and/or other aspects of the present invention are achieved by providing a motor power supply comprising a rectifier which rectifies external AC power into DC power; a capacitance which smoothes the DC power; an inverter, having first and second connection terminals which selectively receive the DC power, and which converts the DC power into driving power to be supplied to a motor having a plurality of power input terminals; a limiting resistance serially connected between the rectifier and a first end of the capacitor, to limit an inrush current applied to the capacitor and to change an overvoltage power applied to the capacitor into heat energy; an over voltage protection diode connected in parallel with the resistance and having a cathode connected to the positive power output terminal of the rectifier; an over voltage protection switching element connected to an anode of the over voltage protection diode and connected to a second end of the capacitance; a dynamic braking resistance having a first end connected to the second end of the capacitance and a second end; a first switching part which selectively bypasses the limiting resistance; a second switching part which selectively connects the inverter with one of the DC power and the second end of the dynamic braking resistance; and a controller which controls the first and second switching parts.

According to an aspect of the invention, the controller controls the second switching part to connect the connection terminal of the inverter with the second end of the dynamic braking resistance when the power is not supplied to the motor.

According to an aspect of the invention, the controller controls the first switching part to connect the first end of the capacitance with the limiting resistance when the external AC power is first supplied.

According to an aspect of the invention, the controller controls the first switching part to connect the first end of the capacitance with the positive power output terminal of the rectifier and controls the second switching part to connect the connection terminal of the inverter with the DC power while the motor is driven.

According to an aspect of the invention, the motor power supply further comprises a voltage sensor which senses a voltage which is generated from the motor and applied across the capacitance, wherein the controller controls the first switching part to connect the first end of the capacitance with the positive power output terminal of the rectifier when the voltage sensor senses that an over voltage is applied across the capacitance.

According to an aspect of the invention, the controller turns on the over voltage protection switching part when the voltage sensor senses that the over voltage applied across the capacitor reaches a predetermined upper limit, and turns off the over voltage protection switching part when the voltage sensor senses that the over voltage applied across the capacitance reaches a predetermined lower limit.

According to an aspect of the invention, the first and second switching parts may be achieved by one multi-contact relay.

According to an aspect of the invention, the multi-contact relay comprises: a first circuit which selectively connects the first end of the capacitance with the limiting resistance; a second circuit which selectively connects the first end of the capacitance with the positive power output terminal of the rectifier; a third circuit which selectively connects the connection terminal of the inverter with the second end of the dynamic braking resistance; and a fourth circuit which selectively connects the connection terminal of the inverter with the DC power, wherein the first and third circuits are interlocked to simultaneously selectively connect and the second and fourth circuits are interlocked to simultaneously selectively connect.

BRIEF DESCRIPTION OF THE DRAWINGS

These and/or other aspects and advantages of the present invention will become apparent and more readily appreciated from the following description of the embodiments, taken in conjunction with the accompany drawings of which:

FIGS. 6A and 6B illustrate voltage waveforms at specific points in the motor power supply of FIG. 5; and FIG. 6C illustrates operation of a switching element in the motor power supply of FIG. 5.

DETAILED DESCRIPTION OF THE PREFERRED EMBODIMENT

Figure 1:
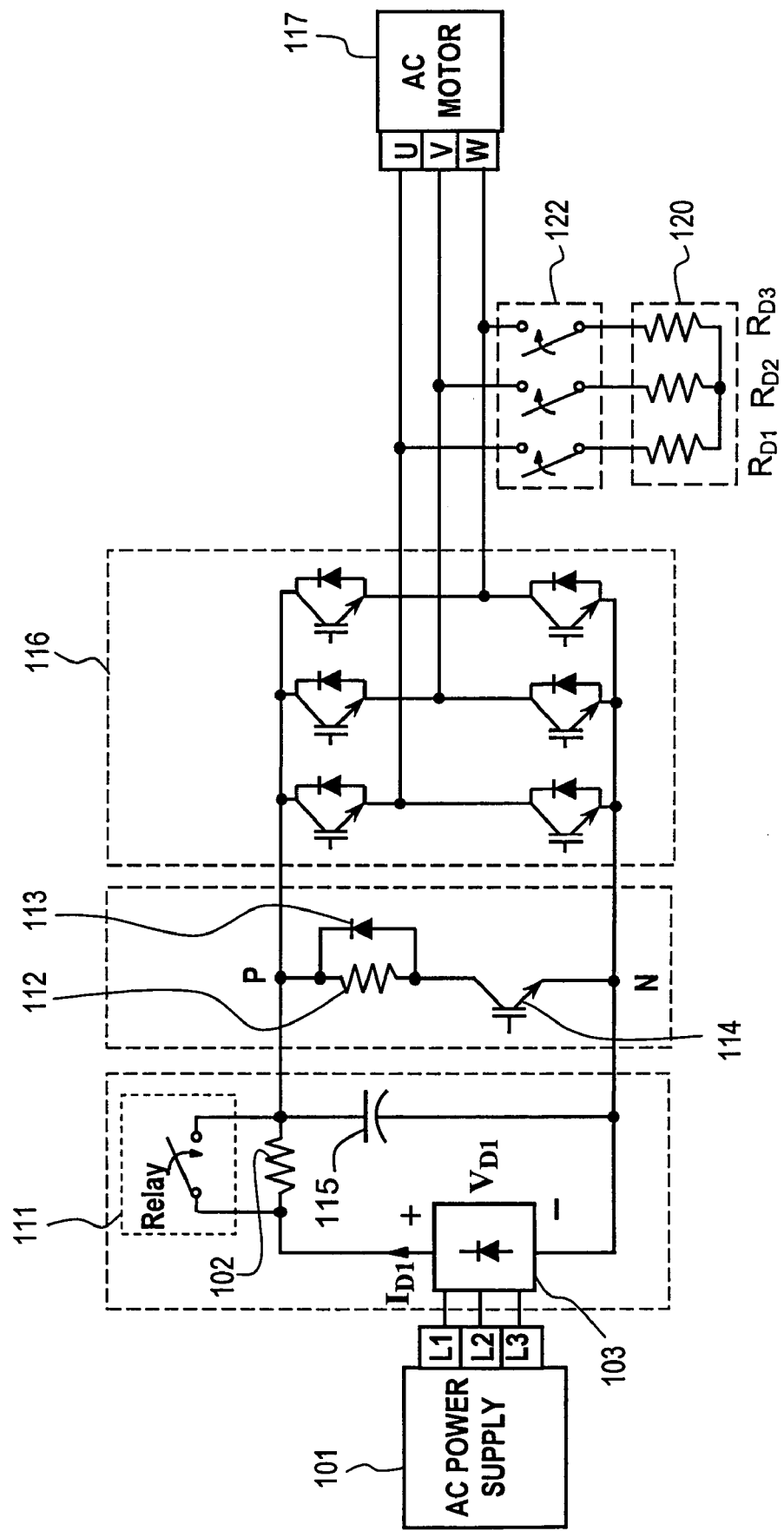
FIG. 1 is a circuit diagram of a conventional motor power supply.

Reference will now be made in detail to the embodiments of the present invention, examples of which are illustrated in the accompanying drawings, wherein like reference numerals refer to like elements throughout. The embodiments are described below in order to explain the present invention by referring to the figures. Hereinafter, a motor power supply for a three-phase motor will be exemplarily described.

Figure 2:
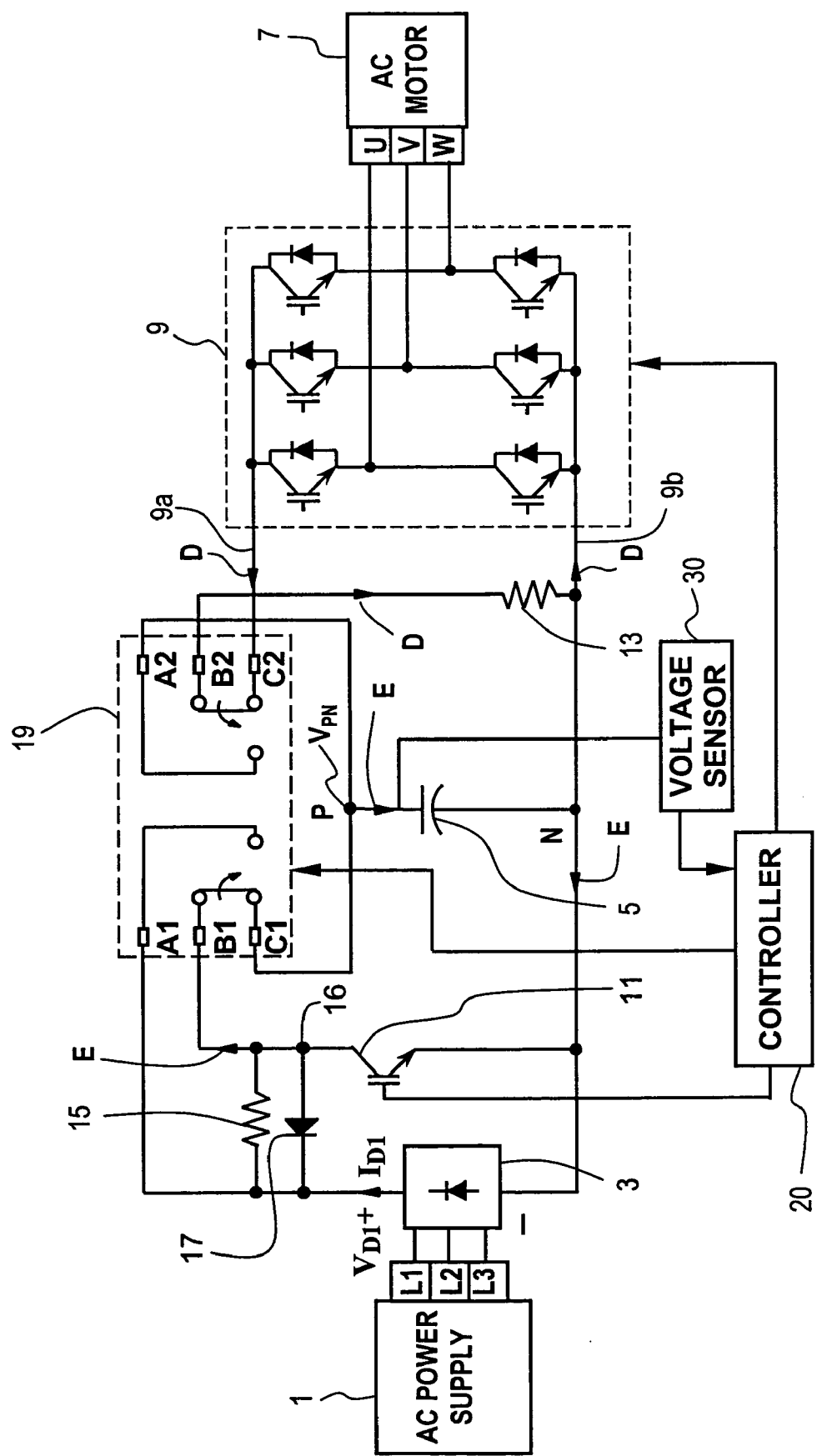
FIG. 2 is a circuit diagram of a motor power supply according to the present invention in the state that a soft charging operation and a dynamic braking operation are performed.
Figure 4:
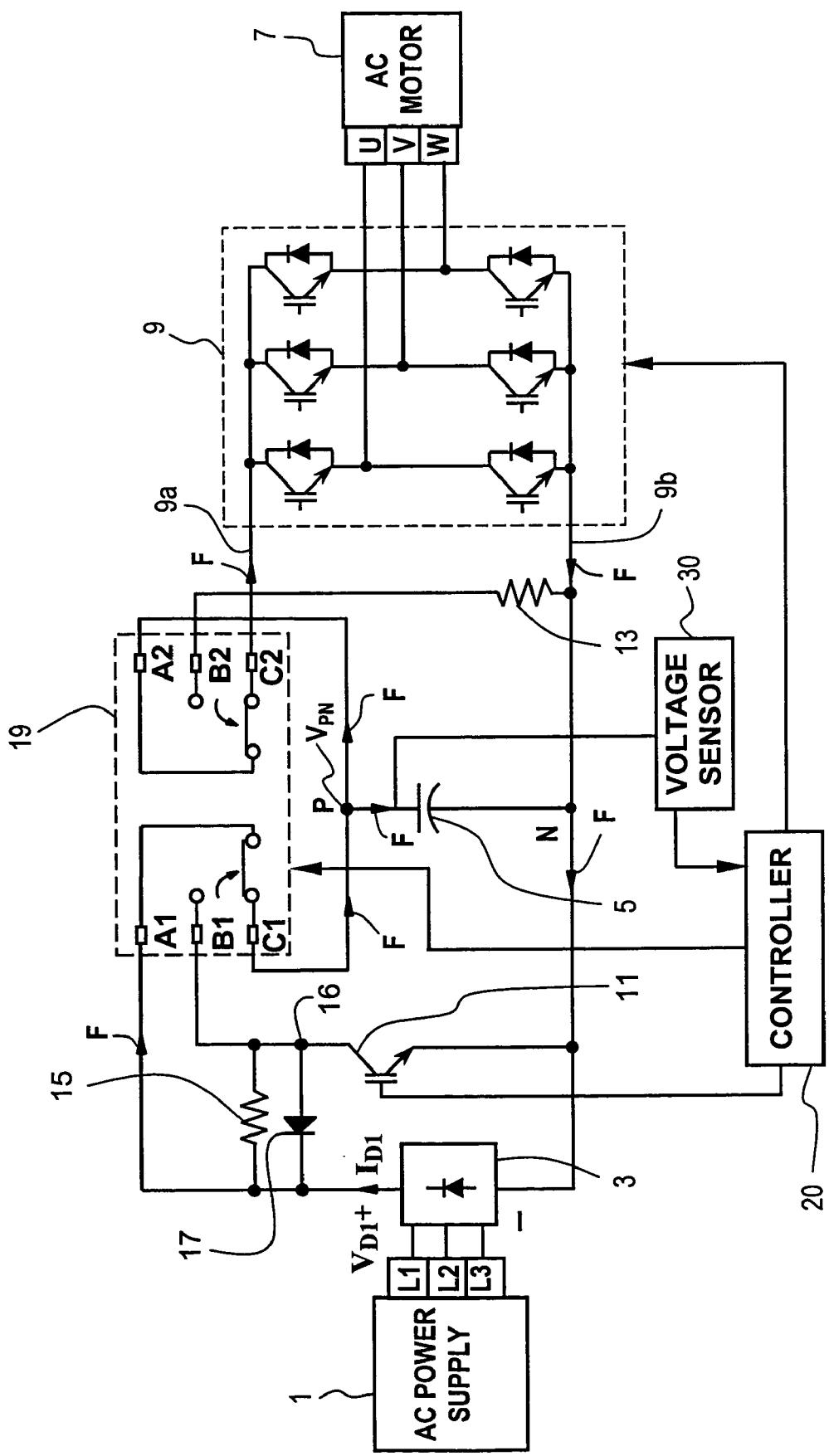
FIG. 4 is a circuit diagram of the motor power supply according to the present invention in a state that power is being supplied to the motor.
Figure 5:
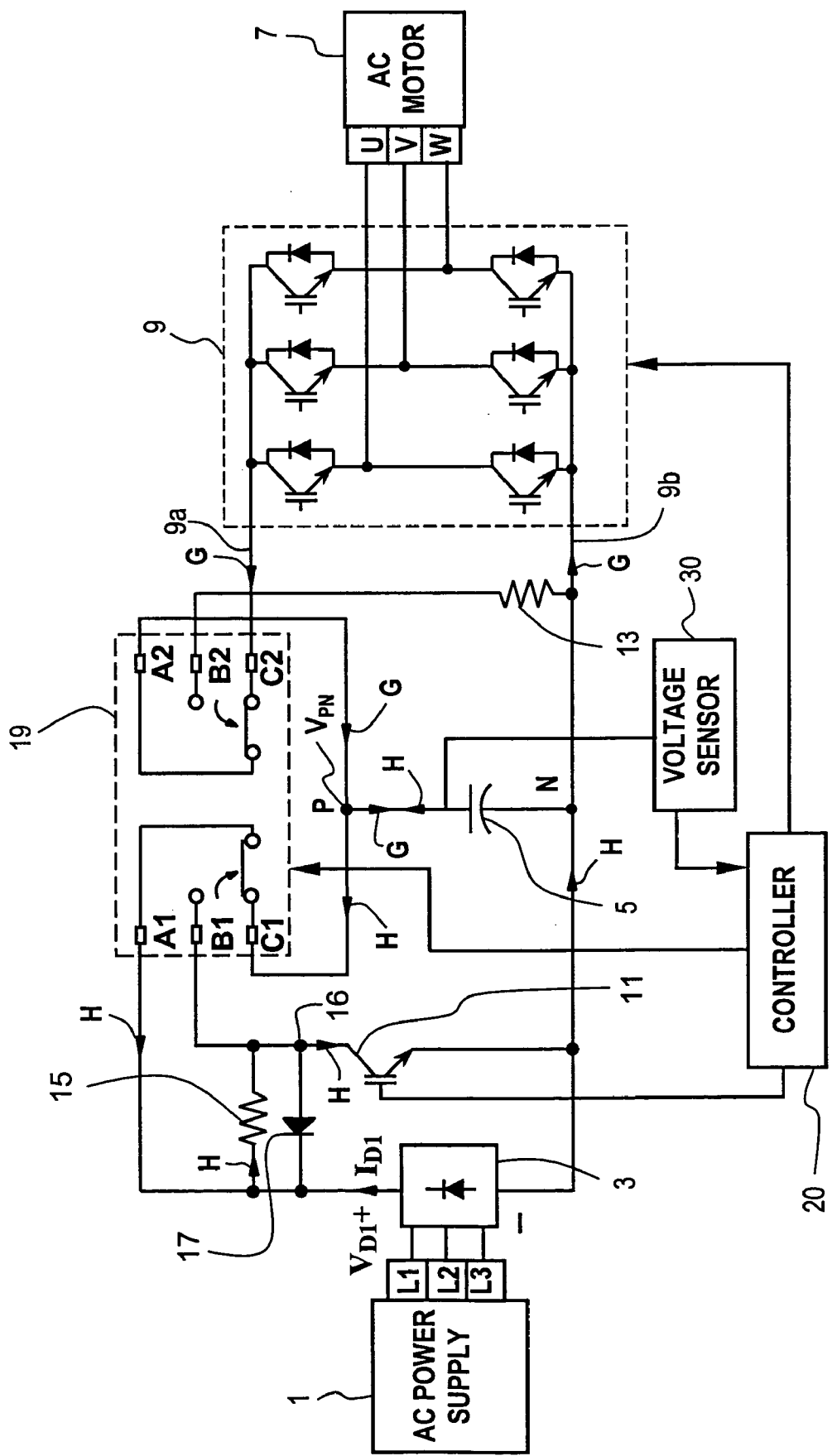
FIG. 5 is a circuit diagram of the motor power supply according to the present invention in the state that an over voltage protecting operation is performed.

FIG. 2 is a circuit diagram of a motor power supply according to the present invention, shown in a state that a soft charging operation and a dynamic braking operation are performed. FIG. 4 is a circuit diagram of the motor power supply according to the present invention in a normal state, i.e., a state where power is being supplied to a motor 7. FIG. 5 is a circuit diagram of the motor power supply according to the present invention in a state that an over voltage protecting operation is performed. As shown in FIGS. 2, 4 and 5, a motor power supply according to the present invention comprises a rectifier 3 which rectifies AC power from an AC power supply 1 into DC power $V_{D1}$, a capacitor 5 which smoothes the DC power from the rectifier 3, and an inverter 9 which converts the smoothed DC power into AC power having three phases and a variable frequency.

The motor power supply according to the present invention further comprises a resistor 15 having a first end connected to a positive terminal (+) of the rectifier 3 and a second end selectively connectable to a first end P of the capacitor 5; an over voltage protection diode 17 connected to the resistor 15 in parallel and having a cathode connected to the positive terminal (+) of the rectifier 3, an anode of the diode 17 and the second end of the resistor being connected at a node 16; an over voltage protection switching element 11 which selectively connects the node 16 and a second end N of the capacitor 5; a dynamic braking resistor 13 selectively connectable between connection terminals 9a and 9b of the inverter 9; a multi-contact relay 19 which selectively connects the first end P of the capacitor 5 with one of the positive terminal (+) of the rectifier 3 and the node 16, and selectively connects the connection terminal 9a of the inverter 9 with one of the first end P of the capacitor 5 and one end of the dynamic braking resistor 13; and a controller 20 which controls the multi-contact relay 19, the inverter 9 and the over voltage protection switching element 11. Further, the motor power supply may further comprise a voltage sensor 30 to sense a voltage $V_{PN}$ applied to the capacitor 5.

In the multi-contact relay 19, a control coil operates the relay. Therefore, contact set A1, B1 and C1 operates together with contact set A2, B2 and C2. In a relay state 1, contacts B1 and C1 are closed, contacts B2 and C2 are closed, contacts A1 and C1 are open, and contacts A2 and C2 are open, as shown in FIG. 2. In a relay state 2, contacts B1 and C1 are open, contacts B2 and C2 are open, contacts A1 and C1 are closed, and contacts A2 and C2 are closed, as shown in FIGS. 4 and 5.

When the multi-contact relay 19 is in the state 1, the resistor 15 is employed to limit a heavy inrush current, thereby protecting the capacitor 5 from the inrush current.

When the AC power supply 1 first supplies the power, the controller 20 controls the multi-contact relay 19 to have the relay state 1 in order to supply the rectified power from the rectifier to the capacitor 5 through the resistor 15. Thus, when the power is first supplied, the power is supplied to the capacitor 5 via the resistor 15, thereby protecting the capacitor 5 from the inrush current.

When the controller 20 controls multi-contact relay 19 to have the relay state 2, the resistor 15 performs an over voltage protecting operation together with the over voltage protection diode 17 and the over voltage protection switching element 11. Thus, the resistor 15 is selectively used in the soft charging operation and the over voltage protecting operation according to the state of the multi-contact relay 19.

The over voltage protection switching element 11 may comprise an MOS (metal-oxide semiconductor) transistor, an FET (field effect transistor), etc., which is turned on/off according to a signal input to a gate thereof. The controller 20 controls the gate signal of the over voltage protection switching element 11, thereby turning on/off the over voltage protection switching element 11.

When the voltage sensor 30 senses that a voltage applied across the capacitor 5 reaches a predetermined over voltage, the controller 20 controls the multi-contact relay 19 to have the connection of the state 2 and controls the over voltage protection switching element 11 to be turned on. The voltage across the capacitor 5 may reach the predetermined over voltage due to energy being regenerated by the motor 7 being passed back through the inverter 9. In the state 2 with the switching element 11 turned on, the over voltage power is changed into heat energy, passing through the resistor 15. Therefore, the capacitor 5 is protected from damage due to the over voltage. Oppositely, when the over voltage is not detected, the controller 20 controls the over voltage protection switching element 11 to be turned off.

When the power is not supplied to the motor 7, the controller 20 controls the multi-contact relay 19 to be in the state 1 which connects the dynamic braking resistor 13 to the inverter 9 and so that the dynamic breaking resistor 9 absorbs any energy remaining in the motor 7, thereby aiding to stop the motor 7 and preventing the motor 7 from being forcibly rotated by an external force after the motor 7 is stopped.

According to the present invention, to perform the dynamic braking operation, one resistor and one multi-contact relay are needed as compared with three resistors and three relays which are respectively connected to the power input terminals of the three-phase motor 7 as in the conventional dynamic breaking circuit shown in FIG. 1.

The soft charging operation, the dynamic braking operation, and the over voltage protecting operation of the motor power supply according to the present invention will be described below.

When the motor 7 is suddenly stopped while being driven or when the motor 7 is being stopped by no power input, the controller 20 controls the multi-contact relay 19 to be in the state 1. Then, a current generated while the motor 7 is being stopped or while the motor is forcibly rotated by an external force is transmitted through the diodes of the inverter 9 and the resistor 15 in a direction indicated by arrows D shown in FIG. 2. While the current generated by the motor 7 is passing through the resistor 15, electrical energy associated with the current is changed into heat energy, thereby preventing the motor 7 from damage and from being forcibly rotated. Thus, the motor power supply according to the present invention performs the dynamic braking operation.

Figure 3A:
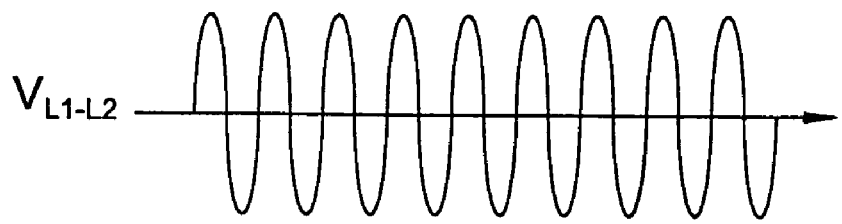
FIGS. 3A–3C illustrate voltage and current waveforms at specific points in the motor power supply of FIG. 2.
Figure 3B:
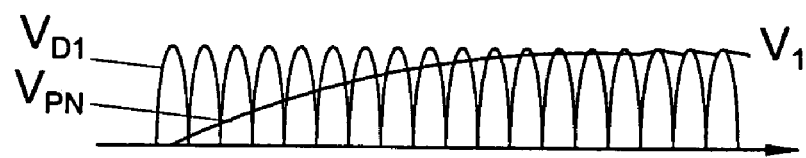

When the AC power supply 1 first supplies the AC power, the controller 20 controls the multi-contact relay 19 to be in the state 1. Then, the AC voltage ($V_{L1}$–$V_{L2}$) supplied from the AC power supply 1 is rectified into DC power by the rectifier 3, and the rectified voltage ($V_{D1}$) passes through the resistor 15, so that the capacitor 5 is charged with the rectified voltage ($V_{D1}$). Here, the resistor 15 performs the soft charging operation where the multi-contact relay 19 is in the state 1 At this time, as the capacitor 5 is charged with the rectified voltage ($V_{D1}$), a voltage ($V_{PN}$) applied across the capacitor 5 is gradually increased as shown in FIG. 3B and current flows in a direction indicated by arrows E in FIG. 2.

Figure 3C:
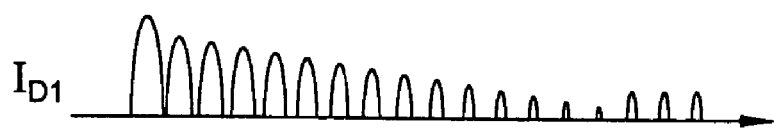
Figure 3D:
FIG. 3D illustrates an operational state of a relay in the motor power supply of FIG. 2.

FIG. 3C illustrates a waveform of a current being transmitted from the rectifier 3 to the resistor 15, and FIG. 3D illustrates a transition of the multi-contact relay 19 from the first state to the second state. When the voltage ($V_{PN}$) applied across the capacitor 5 reaches a predetermined voltage V1, referred to as a charging complete voltage, the controller 20 controls the multi-contact relay 19 to change to the state 2 as shown in FIGS. 4 and 5.

That is, after a lapse of predetermined time since the power was first supplied, when the capacitor 5 is sufficiently charged with the power and has a stable voltage, the controller 20 controls the multi-contact relay 19 to be in the state 2, that is, to connect relay contacts A1 and C1 and contacts A2 and C2. Then, the rectified power is smoothed by the capacitor 5 and supplied to the inverter 9, and the inverter 9 converts the DC power into the three-phase AC power having a variable frequency, thereby supplying the three-phase AC power to the motor 7 (refer to FIG. 4). With power being supplied to the motor 7, currents flow in directions indicated by arrows F in FIG. 4.

Energy stored in the motor 7 while the motor 7 is being driven is recycled and transmitted from the inverter 9 to the capacitor 5 according to a predetermined condition, such as for example, a rotating direction change of the motor 7. For example, the electrical energy stored while the motor 7 is rotated in a clockwise direction is recycled and transmitted from the inverter 9 to the capacitor 5 when the motor 7 is rotated in a counterclockwise direction. Here, the recycled electrical energy transmitted through the inverter 9 increases the voltage ($V_{PN}$) applied across the capacitor 5, with current flowing in a direction indicated by arrows G as shown in FIG. 5. Therefore, the over voltage protection operation is needed.

Referring to FIG. 5, when the multi-contact relay 19 is in the state 2, if the voltage sensor 30 senses that the voltage ($V_{PN}$) applied across the capacitor 5 reaches a predetermined over voltage, the controller 20 controls the motor power supply as follows.

FIG. 6A shows a reference waveform of an input supply voltage $V_{L1-L2}$ and FIG. 6B shows the voltage $V_{PN}$ across the capacitor 5. In the case where the over voltage is within a hysteresis range ($V_{H1}$~$V_{H2}$) while the multi-contact relay 19 is in the state 2, if the over voltage reaches the upper limit ($V_{H2}$), the controller 20 turns on the over voltage protection switching element 11 as shown in FIG. 6C, thereby discharging the over voltage through the resistor 15, with current flowing in a direction indicted by arrows H shown in FIG. 5. Therefore, the voltage ($V_{PN}$) applied across the capacitor 5 is decreased. When the over voltage reaches the lower limit ($V_{H1}$), the controller 20 turns off the over voltage protection switching element 11, so that the voltage ($V_{PN}$) applied across the capacitor 5 is increased with the recycled electrical energy. Consequently, the controller 20 controls the voltage ($V_{PN}$) applied across the capacitor 5 to be within the hysteresis range ($V_{H1} \sim V_{H2}$) by turning on/off the over voltage protection switching element 11. As the capacitor 5 operates within the hysteresis range, the over voltage protection switching element 11 is prevented from malfunction due to noise.

In the above-described embodiment, the motor power supply comprises the inverter 9 suitable for supplying the power to the three-phase motor 7. However, the motor power supply may comprise the inverter suitable for supplying the power to a single-phase motor or a multi-phase motor.

In the above-described embodiment, there is provided one multi-contact relay which is shown in a form of a double pole, double throw (DPDT) relay. However, two single pole single throw (SPST) relays may also be used or equivalent switching may be accomplished using other devices.

As described above, a number of elements is decreased by sharing some elements among different operations of the motor power supply, thereby decreasing a size and a production cost of the motor power supply.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A motor power supply comprising:
   a rectifier which rectifies external AC power into DC power;
   a capacitance which smoothes the DC power;
   an inverter having first and second connection terminals and which converts the DC power into driving power to be supplied to a motor;
   a first resistance having a first end connected to a positive power output terminal of the rectifier and a second end;
   an over voltage protection diode having a cathode connected to the positive power output terminal of the rectifier and an anode connected to the second end of the first resistance;
   an over voltage protection switching element connected between the anode of the over voltage protection diode and a second end of the capacitance;
   a second resistance having a first end connected with the second end of the capacitance and a second end;
   a first switching part which selectively connects the first end of the capacitance with one of the positive power output terminal of the rectifier and the second end of the first resistance;
   a second switching part which selectively connects the first connection terminal of the inverter with one of the first end of the capacitance and the second end of the second resistance; and
   a controller which controls the first and second switching parts to selectively connect the first and second resistances, respectively.

2. The motor power supply according to claim 1, wherein:
   the controller controls the second switching part to connect the first connection terminal of the inverter with the second resistance to dynamically brake the motor when the driving power is not supplied to the motor.

3. The motor power supply according to claim 1, wherein:
   the controller controls the first switching part to connect the first end of the capacitance with the second end of the first resistance when the AC power is first supplied.

4. The motor power supply according to claim 1, wherein:
   the controller controls the first switching part to connect the first end of the capacitance with the positive power output terminal of the rectifier and controls the second switching part to connect the first connection terminal of the inverter with the first end of the capacitance while the motor is driven.

5. The motor power supply according to claim 1, further comprising:
   a voltage sensor which senses a voltage across the capacitance, wherein:
   the controller controls the first switching part to connect the first end of the capacitance with the positive power output terminal of the rectifier when the voltage sensor senses that an over voltage is applied across the capacitance.

6. The motor power supply according to claim 5, wherein the controller:
   turns on the over voltage protection switching element when the voltage sensor senses that the voltage across the capacitance has reached a predetermined upper limit, and
   turns off the over voltage protection switching element when the voltage sensor senses that the voltage applied across the capacitance has reached a predetermined lower limit.

7. The motor power supply according to claim 1, wherein:
   the first and second switching parts are achieved by one multi-contact relay.

8. The motor power supply according to claim 7, wherein:
   the multi-contact relay connects the first end of the capacitance with the positive power output terminal of the rectifier and connects the first connection terminal of the inverter with the first end of the capacitance; or
   the multi-contact relay connects the first end of the capacitance with the second end of the first resistance and connects the first connection terminal of the inverter with the second end of the second resistance.

9. The motor power supply according to claim 2, wherein:
   the first and second switching parts are achieved by one multi-contact relay.

10. The motor power supply according to claim 9, wherein:
    the multi-contact relay connects the first end of the capacitance with the positive power output terminal of the rectifier and connects the first connection terminal of the inverter with the first end of the capacitance; or
    the multi-contact relay connects the first end of the capacitance with the second end of the first resistance and connects the first connection terminal of the inverter with the second end of the second resistance.

11. The motor power supply according to claim 3, wherein:
    the first and second switching parts are achieved by one multi-contact relay.

12. The motor power supply according to claim 11, wherein:
    the multi-contact relay connects the first end of the capacitance with the positive power output terminal of the rectifier and connects the first connection terminal of the inverter with the first end of the capacitance; or
    the multi-contact relay connects the first end of the capacitance with the second end of the first resistance and connects the first connection terminal of the inverter with the second end of the second resistance.

13. The motor power supply according to claim 4, wherein:
the first and second switching parts are formed in one multi-contact relay.

14. The motor power supply according to claim 13, wherein:
the multi-contact relay connects the first end of the capacitance with the positive power output terminal of the rectifier and connects the first connection terminal of the inverter with the first end of the capacitance; or
the multi-contact relay connects the first end of the capacitance with the second end of the first resistance and connects the first connection terminal of the inverter with the second end of the second resistance.

15. The motor power supply according to claim 5, wherein:
the first and second switching parts are formed in one multi-contact relay.

16. The motor power supply according to claim 15, wherein:
the multi-contact relay connects the first end of the capacitance with the positive power output terminal of the rectifier and connects the first connection terminal of the inverter with the first end of the capacitance; or
the multi-contact relay connects the first end of the capacitance with the second end of the first resistance and connects the first connection terminal of the inverter with the second end of the second resistance.

17. The motor power supply according to claim 6, wherein:
the first and second switching parts are formed in one multi-contact relay.

18. The motor power supply according to claim 17, wherein:
the multi-contact relay connects the first end of the capacitance with the positive power output terminal of the rectifier and connects the first connection terminal of the inverter with the first end of the capacitance; or
the multi-contact relay connects the first end of the capacitance with the second end of the first resistance and connects the first connection terminal of the inverter with the second end of the second resistance.

19. A power supply for driving a motor and having an inrush protection mode, a motor drive mode, an overvoltage protection mode and a dynamic braking mode, the power supply comprising:
a rectifier which converts AC power to DC power;
a capacitance which smoothes the DC power;
an inverter which converts the DC power to AC power to drive the motor;
a first resistance which limits a charge current into the capacitance during the inrush protection mode and limits a discharge current from the capacitance during the overvoltage protection mode;
a switching element which conducts the discharge current during the overvoltage protection mode;
a second resistance which dissipates energy regenerated by the motor during the dynamic braking mode;
a first controllable switch which bypasses the first resistance during the motor drive mode;
a second controllable switch which disconnects the inverter from the DC power and connects the inverter to the second resistance during the dynamic braking mode; and
a controller which controls the mode by controlling the first and second controllable switches and the switching element.

20. The power supply of claim 19, wherein:
the controller controls the first and second controllable switches and the switching element so that the dynamic braking mode and the overvoltage protection mode are simultaneously operable.

21. The power supply of claim 19, wherein:
the controller controls the first and second controllable switches and the switching element so that the dynamic braking mode and the inrush protection mode are simultaneously operable.

22. The power supply of claim 19, wherein:
the controller controls the first and second controllable switches and the switching element so that the overvoltage protection mode and the motor drive mode are simultaneously operable.

23. The power supply of claim 19, wherein:
the controller controls the first and second controllable switches and the switching element so that the motor drive mode and the inrush protection mode are not simultaneously operable.

24. The power supply of claim 19, wherein:
the power supply further comprises a voltage sensor which monitors a voltage across the capacitance, and
the controller engages the overvoltage protection mode if the voltage across the capacitance exceeds a first predetermined value.

25. The power supply of claim 24, wherein:
the controller disengages the overvoltage protection mode if the voltage across the capacitance is reduced below a second predetermined value due to operation of the power supply in the overvoltage protection mode.

26. The power supply of claim 19, wherein:
the power supply further comprises a voltage sensor which monitors a voltage across the capacitance, and
the controller engages the motor drive mode when the voltage across the capacitor exceeds a predetermined value.

27. A power supply for driving a motor and having an inrush protection mode, an overvoltage protection mode, and a motor drive mode, the power supply comprising:
a rectifier which converts AC power to DC power;
a capacitance which smoothes the DC power;
an inverter which converts the DC power to AC power to drive the motor;
a resistance; and
first and second switching elements which selectively connect the resistance to limit a charge current into the capacitance during the inrush protection mode, to conduct a discharge current from the capacitance during the overvoltage protection mode, and to bypass the resistance during the motor drive mode.

* * * * *